Patented July 31, 1951

2,562,803

UNITED STATES PATENT OFFICE 2,562,803

MANUFACTURE OF ACETONE-DIPHENYL-AMINE CONDENSATION PRODUCTS

Ivan Mankowich, Naugatuck, Conn., assignor to United States Rubber Company, New York, N. Y., a corporation of New Jersey No Drawing. Application May 19, 1950, Serial No. 163,089

3 Claims. (Cl. 260—576)

This invention relates to an improvement in the manufacture of a homogeneous composite liquid acetone-diphenylamine condensation product. More particularly, it relates to a method of making acetone-diphenylamine liquid composite condensation products which are of such low viscosity that they can be handled readily at ordinary temperatures. The products of my invention are characterized not only by their low viscosity but also by their excellent rubber antioxidant properties and their low free diphenylamine content. Free diphenylamine is not a satisfactory rubber antioxidant.

This application is a continuation-in-part of my copending application, Serial No. 768,491, filed August 13, 1947, now abandoned.

The homogeneous composite liquid products obtained by the condensation of acetone with diphenylamine in accordance with the teachings of ter Horst, United States Patents 1,807,355 and 1,915,108 and Meuser, United States Patent 1,975,167 have attained great commercial importance as rubber compounding materials. When these liquid condensation products are incorporated with natural or synthetic rubber they impart thereto unusual resistance to oxidation both at normal and at elevated temperatures and they also greatly increase flex-resistance, i. e. resistance to failure upon repeated flexing. In fact, they are among the most effective and most satisfactory antioxidants for rubber that have yet been developed.

However, these liquid composite acetone-diphenylamine condensation products have been subject to the serious objection that they have possessed an undesirably high viscosity. Their viscosity is so high that handling and weighing these products are difficult and it has been necessary to heat them to reduce their viscosity in order to enable them to be removed from their containers and otherwise handled during use. The art has recognized that these products would have much greater utility if they had a low viscosity at ordinary temperatures.

The principal object of the present invention is to provide a simple and economical process whereby the viscosity of such liquid composite acetone-diphenylamine condensation products can be so reduced that they can be handled without warming. Another object is to provide such a method which does not impair the antioxidant efficiency and other desirable rubber compounding characteristics of such liquid composite products. Another object is to provide such a process which can be performed directly upon the liquid composite products as they are produced by the above-cited ter Horst and Meuser patents, i. e. without any intermediate treatment to remove residual catalyst therefrom. Numerous other objects of the present invention will more fully hereinafter appear.

I have discovered that the undesirably high viscosity of liquid composite acetone-diphenylamine condensation products made in accordance with the teachings of the above-cited patents to ter Horst and Meuser can be reduced to such an extent that the liquid condensation products can be easily handled at ordinary temperature without the necessity for warming, by simply pyrolyzing such objectionably viscous liquid condensation products at temperatures ranging from 215° C. to 400° C. in the presence of a catalytic amount of a catalyst selected from the group consisting of bromine, iodine, hydrobromic acid, hydriodic acid and non-lead heavy metal bromides and iodides.

I am unable to state with certainty the mechanism by which the pyrolysis of my invention effects reduction in the viscosity of the liquid. I believe, however, that some type of internal rearrangement within the molecular structure of the composite liquid product is involved, which rearrangement is in some manner accompanied by marked reduction in viscosity. I am certain that the mechanism involved is not a furtherance of the original condensation reaction because the starting material is one which has been completely condensed and is incapable of splitting out further water. There is no elimination or evolution of any material during the pyrolysis of my invention. The pyrolysis is carried out in the absence of acetone since the starting material is acetone-free, any unreacted acetone having been removed after the original condensation and prior to the pyrolysis of my invention.

The reduction in viscosity effected by the present invention is not the result of liberation of diphenylamine during the pyrolysis. A high free diphenylamine content of acetone-diphenylamine condensation products normally is coincident with low viscosity but is objectionable for reasons stated below. The free or uncombined diphenylamine content of the product of my invention is, within the limits of analytical error, identical with that of the liquid composite product employed as the starting material. The starting material used in my invention is incapable of regenerating diphenylamine under the conditions of the pyrolysis and the free diphenylamine content therefore remains substantially unchanged.

The unreacted diphenylamine content of both the starting material and the product of my invention is less than 25%. This upper limit is important because free diphenylamine is not a satisfactory rubber antioxidant since it is fugitive and is lost rapidly by migration and volatilization and therefore does not protect the rubber against oxidation upon aging. If the decrease in viscosity were due to an increase in diphenylamine content, the product would be of very dubious value as a rubber antioxidant.

The starting material used in my invention is a brown-black viscous homogeneous composite liquid made by the condensation of acetone and diphenylamine in a molar ratio of acetone to diphenylamine greater than 1:1 at a condensation temperature above 200° C., usually from 220° C. to 260° C., and under superatmospheric pressure, following the teachings of the above-cited United States patents to ter Horst and Meuser. The molar ratio of acetone to diphenylamine usually is within the range of from 1.2:1 up to 4:1, a preferred ratio being approximately 2:1. In accordance with the ter Horst and Meuser patents, these reactants are heated in an autoclave at temperatures ranging between 200° C. and 260° C. in the presence of a catalyst selected from the group consisting of bromine, iodine, hydrobromic acid, hydriodic acid and non-lead heavy metal bromides and iodides. Since the reaction is carried out in a pressure-resisting vessel, almost invariably an autoclave, the pressure developed is that required to hold the reactants in the liquid phase and commonly is of the order of 500 to 700 lbs. per square inch gage. Usually reaction times of the order of 3 to 25 hours are employed. At the end of this time the contents of the autoclave are cooled and the unreacted acetone and the free water are removed by heating under reduced pressure giving a brown-black homogeneous complex liquid which is free from oxygen in any form and which therefore is incapable of giving off any water or undergoing any further condensation upon heating. This liquid is an unusually good rubber antioxidant but its viscosity is objectionably high, being substantially in excess of 100 poises at 30° C. The liquid contains less than 25% by weight of free or uncombined diphenylamine, and, as indicated above, is incapable of regenerating free diphenylamine upon heating. In order to be acceptable commercially as a rubber antioxidant, acetone-diphenylamine liquid composite condensation products must contain less than 25% by weight of free dyphenylamine. Both the starting material to which my invention is applied and the product made by my invention meet this specification.

The viscosity of the starting materials which are pyrolyzed by my invention may vary within wide limits depending upon the particular conditions which were used in carrying out the condensation following the above cited ter Horst and Meuser patents. These condensation products have a viscosity substantially greater than 100 poises at 30° C. The viscosity of the starting material typically ranges from 150 poises to 5000 poises or more. More commonly, however, the product obtained by following the teachings of these patents has a viscosity ranging from 250 to 500 poises and it is to such condensation products that my invention is particularly applicable.

In accordance with my invention the liquid composite condensation product is pyrolyzed at 215° C. to 400° C. until its viscosity is less than 100 poises at 30° C. and preferably until it is less than 50 poises at 30° C. The pyrolysis is conducted in the presence of a catalytic amount of the catalytic materials enumerated above. I have found that the same catalysts which are effective to bring about the condensation are also effective to catalyze the pyrolysis and the attendant reduction in viscosity. Thus, it is not necessary that the starting material be treated to free it from residual catalyst which was employed in the condensation because such residual catalyst will also serve as the catalyst for the pyrolysis step. If, however, the condensation product employed as starting material has been treated to remove such residual catalyst, a catalytic amount of the catalysts enumerated above may be intimately incorporated with the starting liquid in any suitable manner prior to the initiation of the pyrolysis. I have found that the amount of catalyst required to catalyze the pyrolysis step is generally of the same order as that usually employed in the condensation step by which the starting material of my invention was prepared. For example, an amount of catalyst ranging from 0.1 to 5% by weight based on the weight of the starting condensation product, and preferably from 0.1 to 1.0% by weight is used to catalyze the viscosity reduction brought about by the pyrolysis.

I prefer those catalysts which contain iodine such as free iodine or hydriodic acid or non-lead heavy metal iodides. The most highly preferred catalyst is ferrous iodide. Other catalysts which are often employed are iodine, bromine, hydriodicacid, hydrobromic acid and zinc bromide. Of the non-lead heavy metal iodides and bromides, those of tin, aluminum, cobalt, copper, bismuth, antimony, iron, manganese and zinc are preferred because of their ready availability.

The temperature of pyrolysis is critical. For some reason not understood, pyrolysis at temperatures somewhat below 215° C. effects an increase in the viscosity of the liquid composite product. Pyrolysis at still lower temperatures, for example at temperatures the order of 100° to 125° C., effects no change in viscosity. In contrast, pyrolysis at temperatures within my range effects a marked decrease in viscosity. Pyrolysis at temperatures above 400° C. is unsatisfactory because thermal decomposition of the liquid composite product takes place to an objectionable extent. I prefer to pyrolize at from 215° C. to 325° C.

The pyrolysis is usually conducted at atmospheric pressure because of the simplicity of apparatus and control required at such pressure. However, pressures above or below atmospheric may be employed although ordinarily there is no particular advantage in use thereof.

As an example of the use of sub-atmospheric pressure, I may heat the mixture of the starting liquid and the catalyst in a suitable pressure-resisting vessel which is evacuated and which is also provided with a reflux arrangement for condensing any volatilized materials and returning them to the body of the mixture undergoing pyrolysis.

The length of time of pyrolysis will vary widely depending upon many factors including the initial viscosity, the desired final viscosity, the nature of the particular starting material, the nature and amount of pyrolysis catalyst employed, and the temperature at which pyrolysis is effected. In any event, the pyrolysis should be sufficiently prolonged to reduce the viscosity of the liquid to less than 100 poises at 30° C. Preferably the pyrolysis is continued until the viscosity is less than 50 poises at 30° C., since acetone-diphenylamine composite liquid condensation products having a viscosity less than 50 poises at 30° C. are most readily handled without heating.

Generally speaking, the desired reduction in viscosity can be achieved by pyrolizing at the indicated temperatures for from ½ to 10 hours. In general, the time required to achieve a given reduction in viscosity is inversely proportional to the temperature of pyrolysis. Thus at pyrolysis temperatures of 300° C. or higher, the desired reduction in viscosity is often obtained in less than 2 hours whereas at temperatures below 275° C., times of the order of 8 to 10 hours are required to achieve a similar reduction in viscosity.

I am familiar with United States Patent 2,002,642 to Meuser et al., and particularly with Example 5 thereof. This patent discloses the condensation of acetone and diphenylamine at temperatures not exceeding 100° C. to make a white solid condensation product. Such a condensation product is entirely different in physical and chemical properties and particularly in rubber antioxidant effectiveness from the liquid composite acetone-diphenylamine condensation products with which the present invention is concerned. Thus, the rubber antioxidant value of the white solid acetone-diphenylamine condensation product made by the first part of Example 5 of Meuser et al. is quite inferior. Meuser et al. subjected this white solid to further treatment which is described by them as producing a further condensation with the elimination of water. This treatment involved heating the solid reaction product at 250° C. for 3 hours whereby it was converted to a dark viscous liquid. However the dark viscous liquid so produced is not comparable in rubber antioxidant properties with either the starting material or the product of the present invention. As a matter of fact, its rubber antioxidant value is quite limited and it could never compete commercially with the materials with which the present invention is concerned.

I have duplicated Example 5 of the Meuser et al. patent as closely as possible in the laboratory. I have found that the treatment described by Meuser et al. in the second part of Example 5 effects a regeneration of diphenylamine which appears in the product as free diphenylamine. The dark viscous liquid product obtained by duplicating Example 5 as nearly as possible contained 34.4% of free diphenylamine. It had a viscosity of 10.2 poises at 30° C. However this low viscosity was due to the presence of the high proportion of free diphenylamine. This was demonstrated by subjecting the dark liquid product obtained by following Example 5 to distillation to distill off a portion of the free diphenylamine. The free diphenylamine content was reduced in this manner to 14.8% but the removal of the free diphenylamine was accompanied by a marked increase in viscosity. The thus distilled condensation product had a viscosity of 212 poises at 30° C. and thus was more comparable to the material used as starting material in the present invention than to the product of my invention.

The white solid acetone-diphenylamine condensation product which is heated at 250° C. by Meuser et al. contains no free diphenylamine. The melting range of 179-184° C. given by Meuser et al. is inconsistent with the presence at this point of substantial amounts of free diphenylamine, much less the relatively large amounts of free diphenylamine that are found in the final product of their Example 5. It is postulated that the free diphenylamine is liberated simultaneously with the liberation of water. In any event, Meuser et al. at no time have a material which is comparable with either my starting material or my pyrolyzed product. I do not know the reason why the white solid product of Meuser et al. is capable of liberating free diphenylamine upon being subjected to their heat treatment whereas the material treated by my invention is not capable of such liberation.

It should be pointed out that the condensation of acetone and diphenylamine is extremely complicated and only partly understood at the present time. The condensation products are of such nondescript nature as to defy either simple or lengthy factual chemical explanation. The condensation conditions, and particularly the condensation temperature, greatly and irreversibly affect the nature of the product obtained and its utility as a rubber antioxidant. Hence the combination, in Meuser et al., of a low temperature preliminary condensation of acetone and diphenylamine at atmospheric pressure followed by treatment at 250° C. and at atmospheric pressure yields a product which is entirely different from the starting material with which I am dealing which is characterized by the fact that it was made by condensation at a temperature above 200° C. and at superatmospheric pressure sufficient to hold the reactants in liquid phase which conditions were maintained throughout the condensation of the acetone and diphenylamine.

From the foregoing, it will be seen that it is not possible to achieve the results of my invention by following the teachings of the Meuser et al. patent.

An additional marked difference between the present invention and Example 5 of the Meuser et al. patent is that the pyrolysis step of my invention is catalyzed by much smaller amounts of catalyst than were present in the Meuser et al. procedure. Thus in Example 5 of Meuser et al., the percentage of iodine in the material heated at 250° C. was about 3.4%. In another experiment, I duplicated Example 5 except that the amount of catalyst used was reduced to a value corresponding to 1.14% of iodine. With this modification, the product obtained upon heating the white solid for 3 hours at 250° C. contained 62% of free diphenylamine. The product obtained was wholly unsatisfactory because of this exceedingly high free diphenylamine content. Furthermore the product was a two-phase mush which would not be at all acceptable commercially and in fact would have no practical or commercial value whatever since an acceptable rubber antioxidant must be a homogeneous material.

I am also aware of United States Patent 2,202,934 to Tuley et al. This patent describes the manufacture of solid, resinous acetone-diphenylamine condensation products by passing acetone vapor into an agitated body of molten diphenylamine at temperatures ranging from 100° C. to about 200° C., stating that at temperatures above 170° C. loss of catalyst, loss of amine and softer products result. This patent further states that at temperatures below 140° C. soft reaction products containing much unreacted amine result. However this patent does not teach that pyrolysis of the liquid acetone-diphenylamine products with which I am dealing would convert them from products of objectionably high viscosity to products of low viscosity.

I am also familiar with Dewey United States Patent 2,233,590 but this shows the preparation of solid, resinous acetone-diphenylamine condensation products in an autoclave at temperatures ranging from 110° C. to 200° C. and preferably from 140° C. to 160° C. and teaches nothing suggesting the pyrolysis of my invention.

The pyrolysis of the present invention can be conducted in any suitable manner and equipment. It may be carried out batchwise, for example, by heating an intimate mixture of the starting liquid and catalyst at the specified temperature in any suitable type of vessel. It may be carried out continuously, for example, by passing a stream of the starting liquid in admixture with the catalyst through a suitable heated tube. After pyrolysis the pyrolyzate may be cooled to a suitable temperature whereupon, if desired, residual catalyst can be removed in any suitable manner as by washing with aqueous sodium hydroxide followed by drying. The resulting material is ready for use as a rubber antioxidant.

The following example illustrates my invention in more detail:

*Example*

The liquid composite reaction product of acetone (2 mols) and diphenylamine (1 mol) prepared according to the procedure of Example 1 of Meuser, United States 1,975,167 and having a viscosity of 390 poises at 30° C. was used for the pyrolysis. This material had been freed from unreacted ketone and from residual catalyst.

The pyrolysis was carried out by mixing a ferrous iodide catalyst with the liquid composite acetone-diphenylamine condensation product and then heating at atmospheric pressure at the indicated temperature for the length of time indicated in the table below. The pyrolyzate was cooled and the viscosity at 30° C. was determined. The table sets forth the results of the pyrolysis.

Approximately 0.46% ferrous iodide corresponding to 0.38% iodine was added and different portions of the mixture were submitted to pyrolysis as indicated.

| Temperature | Time | |
| --- | --- | --- |
| | Two Hours | Eight Hours |
| | *Poises* | *Poises* |
| 150° C | 598 | 660 |
| 200° C | 610 | 586 |
| 215° C | 355 | 349 |
| 235° C | 265 | 128 |
| 250° C | 136 | 19 |
| 300° C | 79 | 8.1 |
| 320° C | 49 | 8.9 |

From the table it will be seen that the viscosity of the original condensation product was greatly increased by pyrolysis at temperatures below 215° C., namely at 150° C. and at 200° C., for times of two and eight hours. On the contrary pyrolysis at a temperature of 215° C. effected a substantial decrease in the viscosity of the material and pyrolysis at higher temperatures effected a still further decrease. The rubber antioxidant properties of the pyrolyzed product were fully equivalent to those of the original condensation product and the products of the pyrolysis which had a viscosity less than 50 poises had the important advantage over the unpyrolyzed material of being very readily handled at ordinary room temperature, thus eliminating the necessity for warming.

From the foregoing, it will be seen that the present invention offers many advantages. The process is simple and easy to carry out. The equipment and control requirements are simple. The invention provides an economical and effective method of preparing desirable low viscosity acetone-diphenylamine composite liquid condensation products from such condensation products which have undesirably high viscosity, thus facilitating handling and use. The rubber antioxidant properties and utility in rubber compounding are not impaired in any manner by the pyrolysis. The pyrolysis is not accompanied by any liberation or regeneration of diphenylamine, the proportions of free and combined diphenylamine in the product being identical, within the limits of analytical error, with those in the starting material. Another advantage is that a small amount of catalst is effective to catalyze the viscosity reduction which takes place upon pyrolysis. Other advantages of my invention will be readily apparent to those skilled in the art.

Having thus described my invention, what I claim and desire to protect by Letters Patent is:

1. The method which comprises pyrolyzing at from 215° to 400° C. a pre-formed substantially completely condensed liquid composite acetone-diphenylamine condensate, said condensate being substantially acetone-free, being incapable of eliminating any material during the said pyrolyzing, containing less than 25% of free diphenylamine and having a viscosity substantially greater than 100 poises at 30° C., said pyrolyzing being in the presence of a catalytic amount of a catalyst selected from the group consisting of bromine, iodine, hydrobromic acid, hydriodic acid and the bromides and iodides of tin, aluminum, cobalt, copper, bismuth, antimony, iron, manganese and zinc, said pyrolyzing being continued until said condensate has a viscosity substantially less than 100 poises at 30° C.

2. The method which comprises pyrolyzing at from 215° to 325° C. a pre-formed substantially completely condensed liquid composite acetone-diphenylamine condensate, said condensate being substantially acetone-free, being incapable of eliminating any material during the said pyrolyzing, containing less than 25% of free diphenylamine and having a viscosity of from 250 to 500 poises at 30° C., said pyrolyzing being in the presence of a catalytic amount of a catalyst selected from the group consisting of bromine, iodine, hydrobromic acid, hydriodic acid and the bromides and iodides of tin, aluminum, cobalt, copper, bismuth, antimony, iron, manganese and zinc, said pyrolyzing being continued until said condensate has a viscosity less than 50 poises at 30° C.

3. The method which comprises pyrolyzing at from 215° to 325° C. and at atmospheric pressure a pre-formed substantially completely condensed liquid composite acetone-diphenylamine condensate, said condensate being substantially acetone-free, being incapable of eliminating any material during the said pyrolyzing, containing less than 25% of free diphenylamine and having a viscosity of from 250 to 500 poises at 30° C., said pyrolyzing being in the presence of from 0.1 to 1.0% of ferrous iodide based on the weight of said condensate, said pyrolyzing being continued until said condensate has a viscosity less than 50 poises at 30° C.

IVAN MANKOWICH.

No references cited.